Patented Apr. 1, 1941

2,236,954

UNITED STATES PATENT OFFICE 2,236,954

COMPLEX METAL COMPOUNDS AND PROCESS OF MAKING SAME

Fritz Straub and Peter Pieth, Basel, Switzerland, assignors to the firm of Society of Chemical Industry in Basle, Basel, Switzerland No Drawing. Application May 16, 1938, Serial No. 208,321. In Switzerland May 19, 1937

6 Claims. (Cl. 260—149)

It has been found that azo-dyestuffs containing metal in complex union can be produced by treating azo-dyestuffs of the general formula

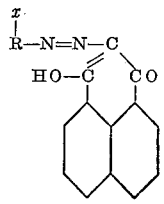

wherein $x$ stands for a lake-forming group and R stands for a benzene radical which contains $x$ in ortho-position to the azo-group and apart from this does not contain a carboxyl group as further substituent, with agents yielding metal whose atomic weight does not exceed 58.9.

The azo-dyestuffs of the above formula serving as parent materials for the invention may be made for example by coupling a diazotized ortho-hydroxy-aminobenzene, an ortho-alkoxyaminobenzene or an ortho-carboxyaminobenzene, which may be further substituted, for example by halogens, such as chlorine and bromine, or a nitro- or sulfonic acid group, in an alkaline solution with perinaphthindandione. Valuable dyestuffs are particularly obtained when using for the coupling with perinaphthindandione diazo-compounds of 1-hydroxy-2-aminobenzene sulfonic acids which have the sulfonic acid group in 4- or 6-position and if necessary still contain a further substituent in 4- or 6-position.

The azo-dyestuff may be treated with the agent yielding metal, for example an agent yielding chromium, nickel or iron, in substance, in the dye bath or on the fibre. The treatment of the dyestuff in substance may be conducted in the customary manner in an acid, neutral or alkaline medium, with or without suitable additions such as sodium chloride, a salt of an organic acid, for example tartaric acid, or a free acid and in presence or absence of an organic solvent or diluent such as alcohol, glycerine or pyridine; the treatment may occur in an open vessel or under pressure.

The treatment of the azo-dyestuff in the dye bath or on the fiber with the agent yielding metal, preferably an agent yielding chromium, is conducted according to the customary known methods.

The dyestuffs are suitable for dyeing and printing various materials and are advantageously suitable for producing fast dyeings on animal fibers such as wool, silk and leather.

The following examples illustrate the invention, the parts being by weight unless otherwise stated and parts by weight being related to parts by volume as is the kilo to the litre:

Example 1

23.4 parts of 2-amino-6-nitro-1-hydroxybenzene-4-sulfonic acid are suspended in 100 parts of water, acidified with 25 parts of concentrated hydrochloric acid and diazotized with 6.9 parts of sodium nitrite in the form of a 4N-solution. When diazotization is finished the diazo solution is neutralized with a concentrated sodium carbonate solution and coupled at 0° C. with a solution prepared by dissolving 20 parts of perinaphthindandione, 10 parts by volume of caustic soda solution of 40 per cent strength by volume and 10.6 parts of anhydrous sodium carbonate in 100 parts of water. The dyestuff of the formula

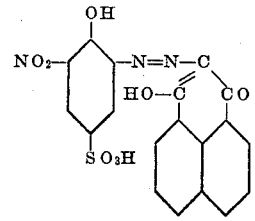

is then precipitated by the addition of common salt, filtered and dried.

It is a black powder having a bronze appearance and is soluble in water to a red solution, somewhat sparingly soluble in sodium carbonate solution of 10 per cent strength and in caustic soda solution of 10 per cent strength to red-orange solutions and soluble in concentrated sulfuric acid to a yellow-orange solution. It dyes wool in an acid bath Bordeaux red shades which become brown-red when after-chromed.

Example 2

189 parts of 2-amino-1-hydroxybenzene-4-sulfonic acid are diazotized in the usual manner and the diazo compound is neutralized with sodium carbonate solution. It is then coupled at 0–5° C. with a solution prepared by dissolving 200 parts of peri-naphthindandione, 100 parts by volume of caustic soda solution of 40 per cent strength by volume and 106 parts of anhydrous sodium carbonate in 1000 parts of water. When coupling is finished the dyestuff of the formula

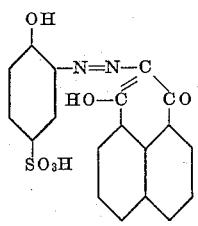

is precipitated by the addition of common salt, filtered and dried.

It is a brown powder which is soluble in water and in sodium carbonate solution of 10 per cent strength to red-orange solutions and in caustic soda solution of 10 per cent strength and in concentrated sulfuric acid to yellow-orange solutions. It dyes wool in an acid bath yellow-orange shades which become brown-red when after-chromed.

*Example 3*

223.5 parts of 4-chloro-2-amino-1-hydroxy-benzene-6-sulfonic acid are suspended in 1000 parts of water and acidified with 220 parts by volume of concentrated hydrochloric acid. Diazotization is conducted in the usual manner by the addition of 69 parts of sodium nitrite in the form of a 4N-solution and the whole is then neutralized with a concentrated sodium carbonate solution. The diazo solution is then coupled at 0–5° C. with a solution prepared by dissolving 200 parts of perinaphthindandione, 100 parts by volume of caustic soda solution of 40 per cent strength by volume and 106 parts of anhydrous sodium carbonate in 1000 parts of water. When coupling is finished the dyestuff of the formula

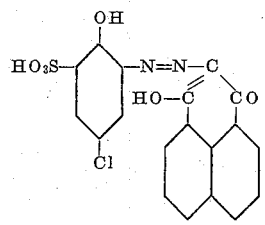

has precipitated completely. It is filtered, washed with dilute common salt solution and dried.

The dyestuff is a black powder having a bronze appearance and is soluble in water and in concentrated sulfuric acid to red-orange solutions and in sodium carbonate solution of 10 per cent strength and caustic soda solution of 10 per cent strength to orange solutions. It dyes wool olive-brown shades which become violet-brown when after-chromed with potassium bichromate.

*Example 4*

21.7 parts of 2-amino-1-carboxybenzene-4-sulfonic acid are diazotized in the usual manner and the diazo compound is coupled at 0–5° C. with a solution prepared by dissolving 20 parts of perinaphthindandione, 10.6 parts of anhydrous sodium carbonate and 10 parts by volume of caustic soda solution of 40 per cent strength by volume in 100 parts of water. The new dyestuff of the formula

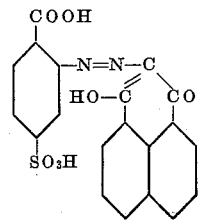

is precipitated by the addition of common salt, filtered and dried.

It is a yellow powder which is soluble in water to a yellow solution and in sodium carbonate solution of 10 per cent strength, caustic soda solution of 10 per cent strength and concentrated sulfuric acid to orange solutions. It dyes wool in an acid bath pure yellow shades which become brown-orange when afterchromed.

*Example 5*

44.1 parts of the azo-dyestuff obtainable as described in Example 1 from diazotized 2-amino-6-nitro-1-hydroxybenzene-4-sulfonic acid and peri-naphthindandione are dissolved in 900 parts of water and the solution is heated to boiling with a chromium formate solution corresponding with 9.1 parts of $Cr_2O_3$ until the azo-dyestuff has become converted into its chromium compound. The whole is then filtered whilst hot and the chromium compound is precipitated by addition of common salt to the filtrate, filtered and dried.

The chromiferous dyestuff is a black-brown powder which is soluble in water and in sodium carbonate solution of 10 per cent strength to red solutions, in caustic soda solution of 10 per cent strength to a yellowish-red solution and in concentrated sulfuric acid to an orange solution. It dyes wool and leather Bordeaux red shades of good fastness properties.

*Example 6*

42.4 parts of the azo-dyestuff obtainable as described in Example 4 from diazotized 2-amino-1-carboxybenzene-4-sulfonic acid and perinaphthindandione are dissolved in 800 parts of water and the solution is heated to boiling with a chromium formate solution corresponding with 9.1 parts of $Cr_2O_3$ until the azo-dyestuff has been completely transformed into its chromium compound. The chromium compound remains fully dissolved and is precipitated by the addition of common salt, filtered and dried.

The chromium compound is an orange powder which is soluble in water and in sodium carbonate solution of 10 per cent strength to orange solutions and in caustic soda solution of 10 per cent strength and concentrated sulfuric acid to yellow-orange solutions. It dyes leather bright brown shades of good fastness properties.

*Example 7*

44.1 parts of the azo-dyestuff from diazotized 4-nitro-2-amino-1-hydroxybenzene-6-sulfonic acid and perinaphthindandione of the formula

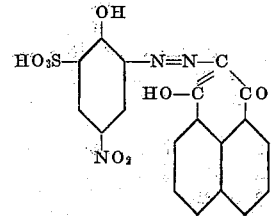

are dissolved in 1200 parts of water and the solution is heated to boiling in a reflux apparatus for 24 hours with a chromium formate solution corresponding with 9.1 parts of $Cr_2O_3$. On cooling the solution the chromium compound separates practically completely and is filtered and dried.

It is a brown powder which is soluble in water to a yellow-red solution, in caustic soda solution of 10 per cent strength and in sodium carbonate solution of 10 per cent strength to orange solutions and in concentrated sulfuric acid to a yellow-orange solution. It dyes wool and leather fast red shades.

*Example 8*

A solution of 4 parts of the azo-dyestuff obtainable as described in Example 2 from diazotized 2-amino-1-hydroxybenzene-4-sulfonic acid and perinaphthindandione in 100 parts of water is heated to boiling with a chromium formate solution corresponding with 0.91 part of $Cr_2O_3$ until the azo-dyestuff has become converted completely into its chromium compound, which can be recognized by the fact that the color of the solution undergoes no further change on continued heating. After cooling the chromium compound is separated by filtering and dried.

It is a brown-black powder which is soluble in water to a blackish-red solution, in sodium carbonate solution of 10 per cent strength and in caustic soda solution of 10 per cent strength to blackish-brown-red solutions and in concentrated sulfuric acid to a reddish-yellow solution. It dyes animal fibres fast Bordeaux red shades.

*Example 9*

43 parts of the azo-dyestuff obtainable as described in Example 3 from diazotized 4-chloro-2-amino-1-hydroxybenzene-6-sulfonic acid and perinaphthindandione are dissolved in 1200 parts of water and the solution is heated in a reflux apparatus for 24 hours with a chromium formate solution corresponding with 8.35 parts of $Cr_2O_3$. The solution is then filtered whilst still hot to remove some insoluble matter and the chromium compound is precipitated from the filtrate by the addition of common salt, filtered and dried.

It is a brown-black powder which is soluble in water and in sodium carbonate solution of 10 per cent strength to red solutions, in caustic soda solution of 10 per cent strength to a yellowish-red solution and in concentrated sulfuric acid to an orange solution. It dyes wool and leather brown-red shades.

*Example 10*

A solution of 47.6 parts of the azo-dyestuff of the formula:

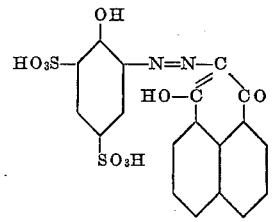

prepared by coupling diazotized 2-amino-1-hydroxybenzene-4:6-disulfonic acid with perinaphthindandione and 27.2 parts of crystallized sodium acetate in 1000 parts of water is heated to boiling for 24 hours with a chromium sulfate solution corresponding with 9.1 parts of $Cr_2O_3$. After this time the formation of the chromium compound is complete. The bulk of the compound separates on cooling. It is filtered and dried.

The chromiferous dyestuff is a violet-black powder which is soluble in water and in sodium carbonate solution of 10 per cent strength to red solutions, in caustic soda solution of 10 per cent strength to a yellowish-red solution and in concentrated sulfuric acid to a yellow solution. It dyes wool and leather brown-red shades of very good fastness properties.

*Example 11*

4.4 parts of the azo-dyestuff from diazotized 4-nitro-2-amino-1-hydroxybenzene-6-sulfonic acid and perinaphthindandione (formula cf. Example 7) are dissolved in 100 parts of water and the solution is heated to boiling for 10 minutes with a solution of 3.4 parts of crystallized nickel sulfate in 20 parts of water. There is then added a solution of 2.8 parts of crystallized sodium acetate in 10 parts of water and the whole is heated to boiling for 10 minutes longer. On cooling the greater part of the dyestuff precipitates.

When dry the dyestuff is a grey-brown powder which is sparingly soluble in water and in sodium carbonate solution of 10 per cent strength to orange solutions and is soluble in concentrated sulfuric acid to a reddish-yellow solution. The nickel compound is insoluble in caustic soda solution of 10 per cent strength. It dyes wool and leather pure red to red-brown shades.

*Example 12*

A freshly prepared paste of chromic hydroxide, corresponding with 8 parts of $Cr_2O_3$, is stirred with 90 parts by volume of potassium hydroxide solution of 50 per cent strength at 60–70° C., whereby a clear solution is produced. The same is mixed with a suspension of 11.9 parts of the azo-dyestuff from diazotized 2-amino-1-hydroxybenzene-4-sulfonic acid and perinaphthandandione (see Example 2) in 100 parts of water, well stirred at 70° C. and heated for two hours to boiling. The mixture is then diluted with 150 parts by volume of water and heated for a further 16 hours to boiling. The whole is allowed to cool to 80° C. and filtered. The new chromium compound which is found in the residue besides chromic hydroxide in excess, is dissolved out with hot water and separated by addition of common salt, then filtered and dried.

It is a grey-black powder dissolving in water to a yellowish red solution, in sodium carbonate solution of 10 per cent strength to a red solution, in caustic soda solution of 10 per cent strength to a red-orange solution and in concentrated sulfuric acid to a yellow solution. It dyes wool fast red-brown tints.

*Example 13*

13,2 parts of the azo-dyestuff from diazotized 2-amino-6-nitro-1-hydroxybenzene-4-sulfonic acid and perinaphthindandione (see Example 1) are dissolved in 600 parts of water and heated for 6 hours to boiling with a solution of 7.5 parts of potassium chromate in 50 parts of water. The chromium compound is then separated by addition of common salt, filtered and dried.

It is a brown powder dissolving in water to a bluish red solution, in sodium carbonate solution of 10 per cent strength to a red solution, in caustic soda solution of 10 per cent strength to a red-orange solution and in concentrated sulfuric acid to an orange-solution. It dyes wool fast Bordeaux red tints.

What we claim is:

1. Complex chromium compounds of azo-dyestuffs of the general formula

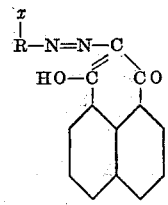

wherein $x$ stands for a lake-forming group and R stands for a benzene radical which contains $x$ in ortho-position to the azo-group and apart from this does not contain a carboxyl group as further substituent.

2. Complex chromium compounds of azo-dyestuffs of the general formula

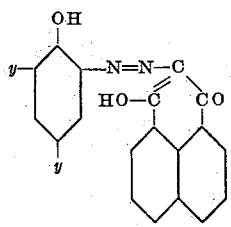

wherein one $y$ stands for a sulfonic acid group and the other $y$ stands for a substituent selected from the group consisting of H, $NO_2$, Cl and $SO_3H$.

3. Complex chromium compounds of the azo-dyestuff of the formula

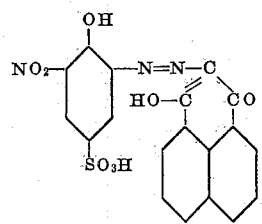

4. Process for the manufacture of azo-dyestuffs containing chromium in complex union, comprising reacting azo-dyestuffs of the general formula

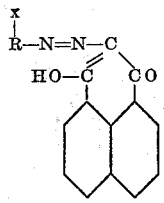

wherein $x$ stands for a lake-forming group and R stands for a benzene radical which contains $x$ in ortho-position to the azo-group and apart from this does not contain a carboxyl group as further substituent, with agents yielding chromium.

5. Process for the manufacture of azo-dyestuffs containing chromium in complex union, comprising reacting azo-dyestuffs of the general formula

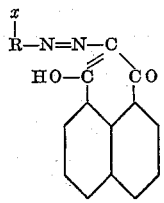

wherein $x$ stands for a lake-forming group and R stands for a benzene radical which contains $x$ in ortho-position to the azo-group and apart from this does not contain a carboxyl group as further substituent, on the fiber with agents yielding chromium.

6. Process for the manufacture of azo-dyestuffs containing chromium in complex union, comprising reacting the dyestuff of the formula

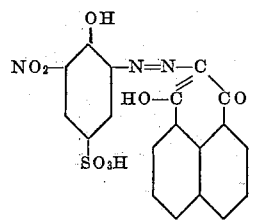

with agents yielding chromium.

FRITZ STRAUB.
PETER PIETH.